US012732341B2

(12) United States Patent
Wang et al.

(10) Patent No.: US 12,732,341 B2
(45) Date of Patent: Sep. 8, 2026

(54) SECURE COMPUTATION USING MULTI-PARTY COMPUTATION AND A TRUSTED EXECUTION ENVIRONMENT

(71) Applicant: Google LLC, Mountain View, CA (US)

(72) Inventors: Gang Wang, Mountain View, CA (US); Marcel M. Moti Yung, Mountain View, CA (US)

(73) Assignee: Google LLC, Mountain View, CA (US)

( * ) Notice: Subject to any disclaimer, the term of this patent is extended or adjusted under 35 U.S.C. 154(b) by 224 days.

(21) Appl. No.: 18/695,676

(22) PCT Filed: Nov. 30, 2022

(86) PCT No.: PCT/US2022/051323
§ 371 (c)(1),
(2) Date: Mar. 26, 2024

(87) PCT Pub. No.: WO2023/196016
PCT Pub. Date: Oct. 12, 2023

(65) Prior Publication Data

US 2026/0128854 A1 May 7, 2026

(30) Foreign Application Priority Data

Apr. 8, 2022 (IL) .......................................... 292083

(51) Int. Cl.
*H04L 9/00* (2022.01)
*H04L 9/06* (2006.01)
*H04L 9/08* (2006.01)

(52) U.S. Cl.
CPC ............ *H04L 9/008* (2013.01); *H04L 9/0618* (2013.01); *H04L 9/085* (2013.01)

(58) Field of Classification Search
CPC ....... H04L 9/008; H04L 9/0618; H04L 9/085; H04L 9/00
See application file for complete search history.

(56) References Cited

U.S. PATENT DOCUMENTS 11,646,878 B2 * 5/2023 Sofia ..................... H04L 9/0825 380/44
2025/0068766 A1 * 2/2025 Gupta ................. G06F 21/6245

FOREIGN PATENT DOCUMENTS

CN 109101822 12/2018
CN 111563261 8/2020

(Continued)

OTHER PUBLICATIONS

Beaver, "Efficient multiparty protocols using circuit randomization." Advances in Cryptology—Crypto'91: Proceedings 11. Springer Berlin Heidelberg, 1992, 13 pages.

(Continued)

*Primary Examiner* — Quazi Farooqui
(74) *Attorney, Agent, or Firm* — Fish & Richardson P.C.

(57) ABSTRACT

Methods, systems, and apparatus, including computer programs encoded on a computer storage medium, for using cryptography, secure MPC, and a TEE to perform computations in ways that preserve data privacy and protect the security of data of each party that is involved in the computation process. In one aspect, a first MPC system of a cluster of MPC systems receives, from a computing system, a first secret share of input data. The first MPC system sends, to an application running in a TEE separate from the cluster of MPC systems, first secret shares of a set of data items generated based at least in part on the first secret share of the input data. The application is configured to generate secret shares of application output data. The first MPC system performs, in collaboration with the one or more second MPC systems of the cluster, one or more secure multi-party computations.

19 Claims, 5 Drawing Sheets

(56) References Cited

FOREIGN PATENT DOCUMENTS

| EP | 3591893 | 3/2021 |
|---|---|---|
| WO | WO 2021083179 | 5/2021 |

OTHER PUBLICATIONS

Choi et al., "Secure multiparty computation and trusted hardware: Examining adoption challenges and opportunities". Security and Communication Networks, Apr. 2019, 28 pages.

Cloud.google.com [online], "Cloud Functions" Apr. 2016, retrieved on Mar. 21, 2023, retrieved from URL <https://cloud.google.com/functions>, 9 pages.

Docs.aws.amazon.com [online], "What is AWS Lambda?" Nov. 2014, retrieved on Mar. 21, 2023, retrieved from URL <https://docs.aws.amazon.com/lambda/latest/dg/welcome.html>, 4 pages.

Felsen, "Secure Two-Party Computation: ABY versus Intel SGX" Master Thesis for the degree of Engineering, University of Technische Universitat Darmstadt, Jan. 10, 2019, 111 pages.

Github.com [online], "Dovekey_auction.md" Mar. 2021, retrieved on Mar. 21, 2023, retrieved from URL <https://github.com/google/ads-privacy/blob/master/proposals/dovekey/dovekey_auction.md>, 9 pages.

Github.com [online], "Dovekey_auction_secure_2pc.md" Mar. 2021, retrieved on Mar. 21, 2023, retrieved from URL <https://github.com/google/ads-privacy/blob/master/proposals/dovekey/dovekey_auction_secure_2pc.md>, 18 pages.

Github.com [online], "Parakeet.md : API flow for Adserving" Feb. 2021, retrieved on Mar. 21, 2023, retrieved from URL <https://github.com/WICG/privacy-preserving-ads/blob/main/Parakeet.md#api-flow-for-ad-serving>, 23 pages.

Github.com [online], "README.md" Nov. 2020, retrieved on Mar. 24, 2023, retrieved from URL <https://github.com/google/ads-privacy/blob/master/proposals/scaup/README.md>, 11 pages.

International Preliminary Report on Patentability in International Appln. No. PCT/US2022/051323, mailed on Oct. 17, 2024, 7 pages.

International Search Report and Written Opinion in International Appln. No. PCT/US2022/051323, mailed on Mar. 31, 2023, 14 pages.

Office Action in Israel Appln. No. 292083, mailed on Jun. 19, 2024, 4 pages.

Wikipedia.org [online], "Cryptographic nonce" Sep. 2006, retrieved on Mar. 21, 2023, retrieved from URL <https://en.wikipedia.org/wiki/Cryptographic_nonce>, 3 pages.

Wikipedia.org [online], "Secret Sharing" Feb. 2004, retrieved on Mar. 21, 2023, retrieved from URL <https://en.wikipedia.org/wiki/Secret_sharing>, 8 pages.

Wikipedia.org [online], "Secure multi-party computation" created on May 2004, retrieved on Mar. 21, 2023, retrieved from URL <https://en.wikipedia.org/wiki/Secure_multi-party_computation>, 13 pages.

Wikipedia.org [online], "Trusted Execution Environment" created on Jun. 2013, retrieved on Mar. 21, 2023, retrieved from URL <https://en.wikipedia.org/wiki/Trusted_execution_environment>, 11 pages.

Wikipedia.org [online], "Turing Completeness" Sep. 2001, retrieved on Mar. 21, 2023, retrieved from URL <https://en.wikipedia.org/wiki/Turing_completeness>, 9 pages.

Bahmani et al., "Secure Multiparty Computation from SGX." Cryptology ePrint Archive, Nov. 2016, 38 pages.

Kumar et al., "Cryptflow: Secure tensorflow inference." 2020 IEEE Symposium on Security and Privacy (SP). IEEE, May 2020, 336-353.

Office Action in Indian Appln. No. 202417016102, mailed on Jun. 1, 2026, 11 pages (with English translation).

* cited by examiner

SECURE COMPUTATION USING MULTI-PARTY COMPUTATION AND A TRUSTED EXECUTION ENVIRONMENT

CROSS-REFERENCE TO RELATED APPLICATIONS

This application is a U.S. National Stage application under 35 U.S.C. § 371 and claims the benefit of priority to International Application No. PCT/US2022/051323, having an International filing date of Nov. 30, 2022, which claims benefit of priority to Israeli Application No. 292083, having a filing date of Apr. 8, 2022 the entire contents of which are hereby incorporated by reference for all purposes.

TECHNICAL FIELD

This specification is related to cryptography and data security.

BACKGROUND

Secure multi-party computation (MPC) is a family of cryptographic protocols that prevents access to data by distributing computations across multiple parties such that no individual party can access another party's data or intermediate computed values, while outputs are released only to designated parties. The MPC computing systems typically perform the computations using secret shares or other encrypted forms of the data and secure exchange of information between the parties.

A Trusted Execution Environment (TEE) is a computing environment where the code that is executed and the data that is being accessed is isolated and protected in terms of confidentiality and integrity. A TEE can be implemented using both computer hardware and software. For example, a TEE can include a hardware isolation mechanism and software, e.g., an operating system, executing on the hardware isolation mechanism.

SUMMARY

In general, one innovative aspect of the subject matter described in this specification can be embodied in methods including the operations of receiving, from a computing system and by a first multi-party computation (MPC) system of a cluster of MPC systems, a first secret share of input data; sending, by the first MPC system and to an application running in a trusted execution environment (TEE) separate from the cluster of MPC systems, first secret shares of a set of data items generated based at least in part on the first secret share of the input data, where the application is configured to generate secret shares of application output data, the secret shares of the application output data generated based on one or more computations using plaintext values of the set of data items, the plaintext values of the set of data items being generated using (i) the first secret shares of the set of data items and (ii) respective second secret shares of the set of data items provided by one or more second MPC systems of the cluster; performing, by the first MPC system in collaboration with the one or more second MPC systems of the cluster, one or more secure multi-party computations using: (i) the first secret share of the input data, (ii) a respective second secret share of the input data items received by each of the one or more second MPC systems, (iii) a first secret share of the output data received from the application by the first MPC system, and (iv) a respective second secret share of the output data received from the application by each of the one or more second MPC systems and sending, by the first MPC system, a first secret share of result data resulting from the one or more secure multi-party computations to at least one of (i) the computing system or (ii) one or more additional computing systems different from the computing system. Other implementations of this aspect include corresponding apparatus, systems, and computer programs, configured to perform the aspects of the methods, encoded on computer storage devices.

These and other implementations can each optionally include one or more of the following features. In some aspects, the computing system generates plaintext result data by combining the first secret share of the result data with a respective secret share of the result data received from each of the one or more second MPC systems.

In some aspects, the application is configured to compute plaintext values of the set of data items by combining the first secret shares of the set of data items with respective second secret shares of the set of data items received from the one or more second MPC systems; perform one or more computations using at least the plaintext values of the second set of data items; generate secret shares of application output data generated based on the one or more computations; provide the first secret share of the application output data to the first MPC system; and provide, to each second MPC system, the respective second secret share of the application output data for the second MPC system.

In some aspects, the first MPC system receives a respective encrypted second secret share of the input data for each of the one or more second MPC systems from the computing system and provides, to each second MPC system, the respective encrypted second secret share of the input data for the second MPC system.

In some aspects, the first MPC system receives the first secret share of the input data and the respective encrypted second secret share of the input data for each of the one or more second MPC systems in a composite request sent from the computing system.

In some aspects, sending, by the first MPC system, a first secret share of result data resulting from the one or more secure multi-party computations to the computing system includes sending a composite message including the first secret share of the result data and respective encrypted second secret shares of the result data received from the one or more second MPC systems.

In some aspects, sending, by the first MPC system, the first secret shares of the set of the data items to the application includes sending, to the application, a composite message including the first secret shares of the set of data items and respective encrypted second secret shares of the set of data items received from the one or more second MPC systems.

In some aspects, the first MPC system receives, from the application, the first secret share of the application output data and a respective encrypted second secret share of the application output data for each of the one or more second MPC systems and provides, to each second MPC system, the respective encrypted second secret shares of the application output data.

In some aspects, prior to sending the first secret shares of the first set of data items to the application, trustworthiness of the application running in the TEE is verified.

In some aspects, the one or more computations performed by the application includes (i) one or more vector dot product computations, (ii) one or more sorting operations, or (iii) a combination of (i) and (ii).

In some aspects, the first secret shares of the set of data items is generated based on the first secret share of the input data and additional data stored by the first MPC system.

Particular embodiments of the subject matter described in this specification can be implemented so as to realize one or more of the following advantages. The systems and techniques described in this document combine secure MPC with operations performed within a TEE, which can ensure that confidential or sensitive data is protected while increasing the performance of, and reducing the latency of, an overall computation process. The secure MPC techniques can ensure that, as long as one of the computing systems in an MPC cluster is honest, no sensitive data can be obtained by any of the computing systems or another party in plaintext. However, the MPC process can be computationally expensive relative to computational techniques that use plaintext values rather than the secret shares used in the secure MPC process, especially for some operations such as sorting data. For example, some operations can require multiple round trip computations that involve sending secret shares of data between the MPC systems and performing operations at each MPC system using the secret shares. Rather than perform these computations using the secure MPC process, the MPC system can transfer computationally expensive tasks to the trusted execution environment, e.g., in a secure manner that prevents access to the data during transmission. An application running in the TEE can combine secret shares to obtain the data in plaintext and perform the computations using the plaintext values in the secure environment of the TEE and send secret shares of the results back to the MPC systems. This provides the same security and privacy guarantees as the secure MPC process would alone, while increasing the speed at which the computations are performed, reducing the amount of data sent between computers, which reduces bandwidth consumption and improves network performance, and reduces the number of processor cycles required to perform the computations. In other words, the combination of the MPC systems with a TEE provides a synergistic effect of preserving data security and confidentiality while increasing the speed of the computations and the performance of the computing resources involved in performing the computations.

A client device that sends secret shares of data to the MPC systems can combine the secret shares into a composite request by encrypting the respective secret shares intended for at least some of the recipients using a respective public key for the recipient. In this way, only the intended recipients can decrypt their secret shares, thereby maintaining the privacy guarantees, while also reducing the amount of bandwidth and power/battery consumption that would be required if the client device transmitted a separate request to each MPC system. Similarly, one of the MPC systems can send a composite message with encrypted secret share(s) to the application running in the TEE and the application can send back encrypted secret share(s) to one of the MPC systems to obtain similar performance advantages when transferring data between the cluster of MPC systems and the TEE.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for using cryptography, secure MPC, and a TEE to perform computations in ways that preserve data privacy and protects the security of data of each party that is involved in the computation process. The techniques described in this document allow for such privacy preservation and data security while still computing the desired results in short time periods by transferring some of the computations from the MPC computers to the TEE.

Figure 1:
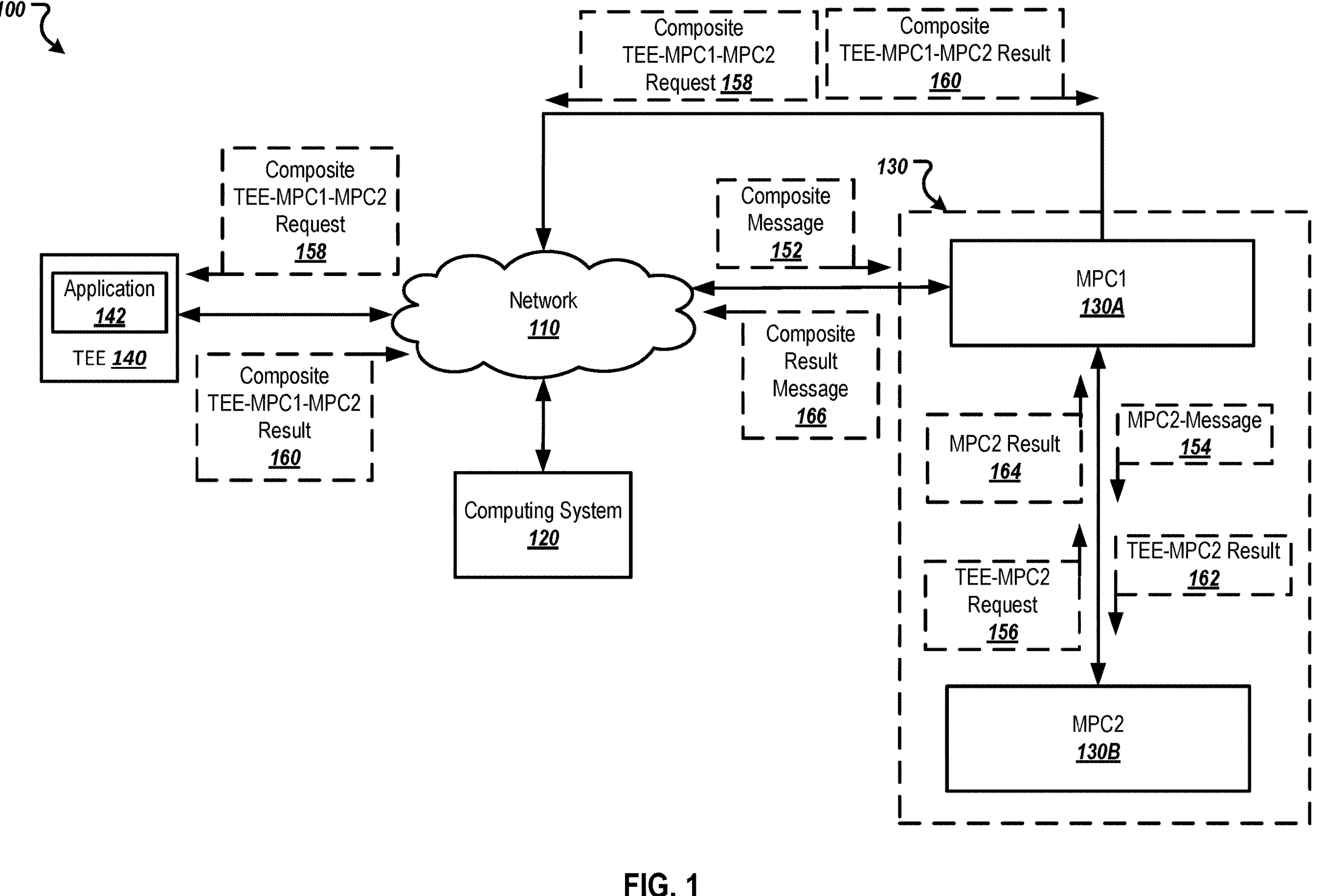
FIG. 1 is a block diagram of an example environment in which an MPC cluster and an application running in a TEE perform computations.
Figure 2:
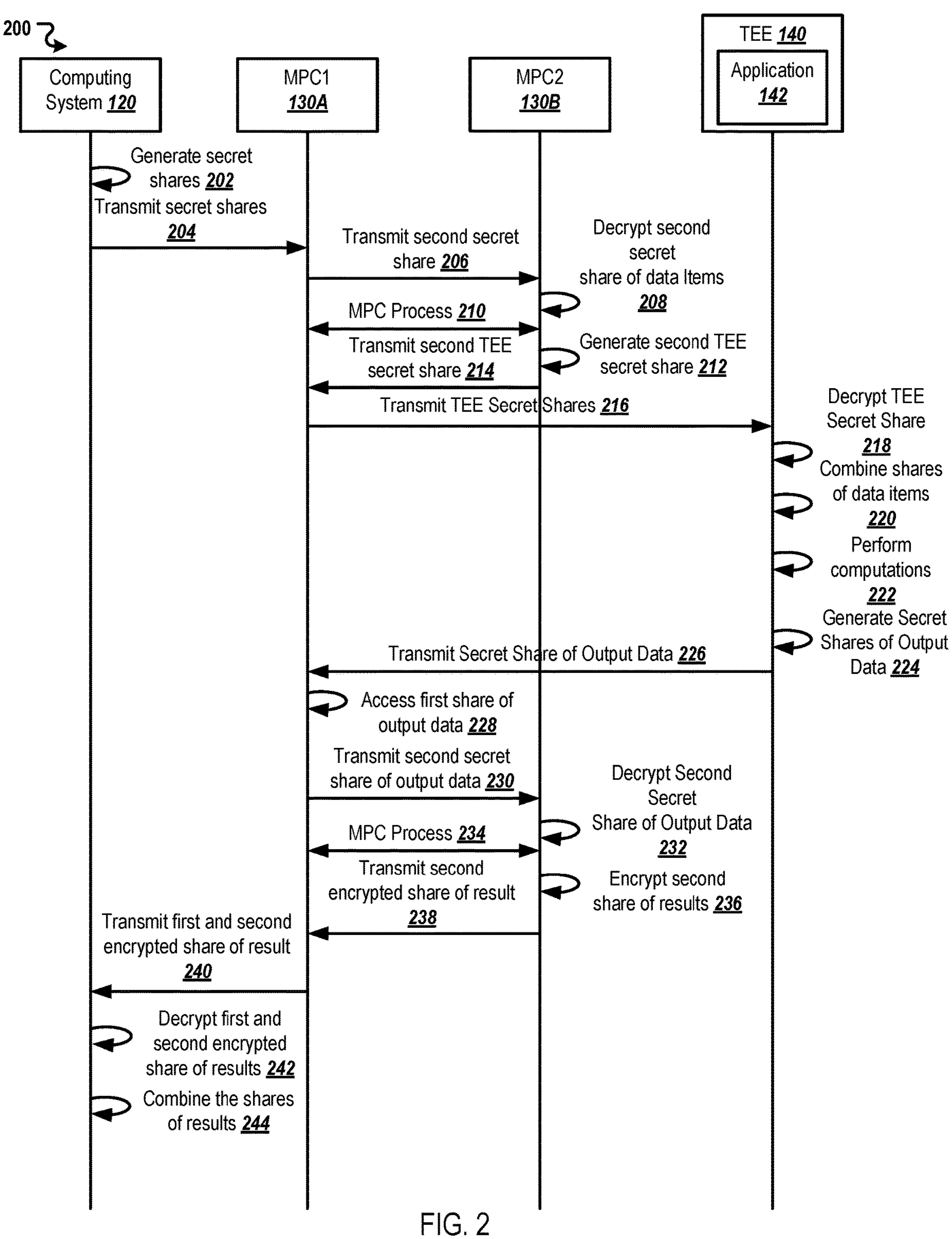
FIG. 2 is a swim lane diagram of an example process of performing computations using an MPC cluster and an application running in a TEE.

FIGS. 1 and 2 are described with reference to an example in which an entity uses a MPC cluster that includes two computation systems MPC1 and MPC2 (hence also referred to as a 2PC system) to compute any desired results. The MPC cluster uses a TEE that executes an application to perform computations, e.g., using a secure function evaluation (SFE) of a function, using parameters that are provided by the MPC computers or the entity. This allows two or more parties to jointly compute a known function without revealing their respective inputs.

For example, assume that an entity using a 2PC system wants to securely evaluate a function $f$ (param) where param constitutes a set of data items that are input parameters of the function f. Also assume that parameters param are confidential data items that should not be disclosed in plaintext to either MPC system or any other entity. Plaintext is text that is not computationally tagged, specially formatted, or written in code, or data, including binary files, in a form that can be viewed or used without requiring a key or other decryption device, or other decryption process. If an entity has access to the parameters param, the entity can compute the value of the function f, which may be undesirable. For ease of subsequent description, P will represent the set of "N" data items.

FIG. 1 is a block diagram of an environment 100 in which an MPC cluster 130 and an application 142 running in a TEE 140 perform computations. The MPC cluster 130 and the application 142 can perform the computations based on a request from a computing system 120 that can be operated by an entity. The computing system 120, the MPC cluster 130 and a TEE 140 are connected via a data communication network 110, such as a local area network (LAN), a wide area network (WAN), the Internet, a mobile network, or a combination thereof.

The example MPC cluster 130 includes two computation systems MPC1 130A and MPC2 130B. MPC1 and MPC2 can perform secure MPC computations based on input data received from the computing system 120. As described below, the input data can be split into secret shares that are provided to the computation systems MPC1 and MPC2. Although the example MPC cluster 130 includes two computation systems, more computation systems can also be used as long as the MPC cluster 130 includes more than one computation system. For example, the MPC cluster 130 can include three computation systems, four computation systems, or another appropriate number of computation systems. Using more computation systems in the MPC cluster 130 can provide more security, but can also increase the complexity of the secure MPC computations. Each computation system MPC1 and MPC2 can be a server or other appropriate type of computer. The computation systems of the MPC cluster 130 can be connected via a network, e.g., a secure network.

The computation systems MPC1 and MPC2 can be operated by different entities. In this way, each entity may not have access to the input data, intermediate data, or result data in plaintext, absent unauthorized collusion between the entities that operate the computation systems MPC1 and MPC2. Advantageously, the different parties operating the different computation systems MPC1 and MPC2 may have no incentive to collude to endanger data privacy. In some implementations, the computation systems MPC1 and MPC2 are separated architecturally and are monitored to not communicate with each other outside of performing the secure MPC processes described in this document.

The TEE 140 is a computing environment where the code that is executed and the data that is being accessed by the TEE 140 is isolated and protected in terms of confidentiality and integrity. TEE 140 can be implemented using both computer hardware and software that is previously verified, audited, and certified by, for example, one or more entities that operate the MPC computation systems MPC1 and MPC2. TEE 140 can be implemented as a part one of the MPC computation systems or it can be implemented as a standalone unit that can communicate with the computation systems of the MPC cluster. For example, the TEE 140 can be configured to only communicate with MPC1and MPC2. That is, in this example implementation, the TEE 140 can only accept inputs from either or both MPC1 and MPC2, and provide outputs as secret shares only to MPC1 and/or MPC2.

The TEE 140 can execute one or more applications, including application 142, within the secure environment provided by the TEE 140. Each application can be configured to perform a particular task. For example, the application 142 can be configured to perform computations on behalf of the MPC cluster 130. For example, the MPC cluster 130 can be configured to perform a set of computations based on input data received from the computing system 120 and optionally additional data stored by the computation systems MPC1 and MPC2 of the MPC cluster 130. Some of these computations can be computationally expensive to perform using a secure MPC process and may require multiple round trips between the computation systems MPC1 and MPC2. Rather than perform these computations using secure MPC, the MPC cluster 130 can provide the data for the computations, e.g., in the form of secret shares as described below, to the application 142. The application 142 can be configured to combine the secret shares to obtain the data for the computations in plaintext, perform the computations using the plaintext data to obtain output data, and provide secret shares of the output data to the computations systems MPC1 and MPC2. Output data obtained by the application 142 can be considered to be application output data. In this way, the application 142 can perform the computations substantially faster and using less network traffic than the computation systems MPC1 and MPC2, while maintaining the privacy guarantees provided by the MPC cluster 130.

The computing system 120 can be an electronic device that is capable of communicating over the network 110. Examples of the computing system 120 can include client devices such as personal computers, mobile communication devices, wearable devices, personal digital assistants, tablet devices, gaming device, media streaming devices, IoT devices (e.g., thermostats, home control units, appliances, and various sensors), and other devices that can send and receive data over the network 102. The computing systems can also be servers providing digital content and/or services to the client devices. Examples of the servers can include content provider servers, application servers, streaming servers, etc.

In some implementations, to initiate secure computations by the MPC cluster 130 and the application 142, the computing system 120 can generate secret shares of input data for the MPC cluster 130. For example, the computing system 120 can create a first secret share of the input data for MPC1 and a second secret share of the input data for MPC2. In some cases, the input data can include a set of data items, e.g., rather than a single value. In such cases, the computing system 120 can generate a first secret share of each data item in the set of data items for MPC1 and a second secret share of each data item for MPC2.

In another example in which the MPC cluster evaluates a function using a parameter received from the computing system 120, the first secret share can include a first additive secret share of the parameter and the second secret share can include a second additive secret share of the parameter. For example, the first secret share can be a random number, the second secret share could be the plaintext value of bitwise-XOR with the first secret share. This type of implementation further allows the computing system 120 to hide the parameter from each of the two MPC systems since none of the two MPC systems have access to both secret shares of the parameter.

Note that each secret share by itself can be a random variable that by itself does not reveal anything about the input data. Both shares would need to be combined to obtain the input data in plaintext. If the MPC cluster 130 includes more computation systems that participate in the secure MPC computations, the computing system 120 would generate more shares, one for each computation system. In some implementations, to ensure data privacy, the computing system 120 can use a pseudorandom function (PRF) to split the input data (e.g., the set of input data items) into shares. That is, the computing system 120 can use PRF to generate two secret shares {[P1], [P2]}. The use of brackets around parameters indicates secret shares or the parameters throughout this document. The exact splitting can depend on the secret sharing algorithm and cryptographic library used by the computing system 120.

After generating the secret shares of the input data, the computing system 120 provides the secret shares to the computation systems of the MPC cluster 130. In some implementations, the computing system 120 provides the first secret share of the input data to MPC1 and the second secret share of the input data to MPC2.

In some implementations, the computing system 120 generates and sends a composite message 152 to one of the computation systems of the MPC cluster 130. In the example shown in FIG. 1, the computing system 120 sends the composite message 152 to MPC1. The composite message 152 can include the first secret share of the input data for MPC1 and encrypted second secret share of the input data for MPC2. The computing system 120 can generate the encrypted second secret share of the input data by encrypting the second secret share of the input data using a public key of MPC2. In this way, only MPC2 can access the second secret share in plaintext by decrypting the encrypted second secret share using its private key that corresponds to the public key. By sending a composite message 152 rather than individual messages to each computation system of the MPC cluster 130, the computing system 120 can conserve computation resources, e.g., processor cycles and battery life, while also reducing the amount of traffic sent across the network 110.

In another example, the computing system 120 can encrypt each secret share using the public key of a respective MPC system of the MPC cluster 130 to create a respective encrypted secret share and transmits the respective encrypted secret share to the respective MPC system of the MPC cluster 130. For example, the computing system 120 can create a first secret share by encrypting the first secret share of the input data using the public key of the MPC1 and a second secret share of the input data using the public key of MPC2. These functions can be represented as PubKeyEncrypt ([P1], MPC1) and PubKeyEncrypt ([P2], MPC2), where PubKeyEncrypt represents a public key encryption algorithm using the corresponding public key of MPC1 or MPC2.

After generating the secret shares, the computing system 120 can transmit the secret shares to the MPC cluster 130. For example, the computing system 120 can create a composite message 152 that includes the first secret share and the second secret share. The composite message 152 is then transmitted to the MPC1. It should be noted that encrypting each share of the input using the public key of the recipient MPC system ensures that no party other than the intended recipient can decrypt the secret share and have access to the share of the input data in plaintext.

In some implementations, the computing system 120 may explicitly assign the same pseudo randomly or sequentially generated identifier to shares of the same secret so as to let the MPC cluster 130 identify shares of the same secret. This enables the computation systems MPC1 130A and MPC2 130B to properly match two secret shares of the same secret, e.g., two shares of the set of data.

In some implementations, after receiving the composite message 152, MPC1 130A can decrypt the first secret share using its private key, if the first secret share is encrypted, thereby obtaining the first secret share of the set of the input data in plaintext. To transmit the second secret share to MPC2, MPC1 can create a message 154 (referred to as a MPC2-message) that includes the second secret share and transmit the message 154 to MPC2. Note that MPC1 does not have access to the second secret share of the input data since the second secret share is encrypted using the public key of MPC2. MPC2 after receiving the MPC2-message 154, decrypts the second secret share using its private key thereby obtaining access to the second secret share of the input data in plaintext.

In some implementations, the computing system 120, MPC1, and MPC2 can use additional techniques such as using digital signatures to verify the authenticity of the composite message 152 received from the computing system 120 and the MPC2-message 154 received from MPC1. For example, the computing system 120 can generate a digital signature of the contents of the composite message 152 using its private key and include the digital signature with the composite message 152. After receiving the composite message 152, MPC1 can use the public key of the computing system 120 to verify the authenticity of the content of the composite message 152. After verification, MPC1 can proceed with further operations as described. Similarly, MPC1 (or computing system 120) can generate a digital signature based on the content of the MPC2-message 154 using its private key. After receiving the MPC2-message 154, MPC2 can use the public key of MPC1 (or computing system 120) to verify the authenticity of the content of the MPC2-message 154. After verification, MPC2 130B can proceed with further operations as described.

The computation systems MPC1 and MPC2 can engage in multiple rounds of computations as part of a secure MPC process to determine a result based on the input data, e.g., to evaluate the function f. However, evaluating the function f using a secure MPC process can be time consuming and may require more computing power when compared to a process of evaluating the function f by a single computing system having access to the input data in plaintext. To overcome such a problem, the MPC cluster 130 can use a TEE 140 to expedite the process of determining the result, e.g., evaluating the function f. For example, the MPC cluster 130 can use the application 142 to perform a subset of the computations that would normally be performed by the MPC cluster 130 using the secure MPC process.

For example, the computation systems MPC1 and MPC2 can perform some computations based on the secret shares of the input data and optionally additional data stored by the computation systems MPC1 and MP2. When it is time to perform computations that are performed by the application 142, the computation systems MPC1 and MPC2 can send data to the application 142 for use in performing the computations. This data can be sent in the form of secret shares to maintain data privacy and security. For example, MPC1 can send, to the application 142, a first secret share of each data item for use in the application's computations and MPC2 can send, to the application 142, a second secret share of each data item. In some implementations, the first secret share and the second secret share of data items generated by MPC1 and MPC2 respectively, can also include (or be generated based on) additional data stored by the MPC1 and MPC2 respectively. For example, MPC1 can generate a first secret share of data items and additional data (for e.g., data that is different from the data items) that is stored in the MPC1 and not shared with MPC2. Likewise, MPC2 can generate a second secret share of data items and additional data stored in MPC2. The application 142 can combine the secret shares to obtain the data items in plaintext, perform computations using the data items, generate secret shares of the output data, and send a first secret share of the output data to MPC1 and a second secret share of the output data to MPC2. The computation systems MPC1 and MPC2 can then continue performing any additional computations based on the secret shares of the output data. Each time the MPC cluster 130 reaches a point in which the application 142 is to perform computations, the computation systems MPC1 and MPC2 can interact with the application 142 in a similar manner.

In some implementations, prior to using application 142 (or the TEE 140), one or more of the computation systems of the MPC cluster 130 can verify the trustworthiness and authenticity of the application 142. For this, the application 142 can use its credentials such as a unique identifier that is known only to the computation systems of the MPC cluster 130. For example, assume that MPC1, MPC2, and the application 142 can have a common knowledge about the credentials of the application 142. To authenticate itself, application 142 can encrypt its credentials using the public key of MPC1 and transmit the encrypted credentials to MPC1. MPC1 can use its private key to decrypt the encrypted credentials of the application 142 to obtain the credentials in plaintext. After decrypting, MPC1 can compare the decrypted credentials of the application 142 to the credentials previously known by the MPC1. If the credentials match, the MPC1 can verify the authenticity of the application 142. The application 142 and MPC2 can follow a similar approach to verify the authenticity of the application 142 if the application 142 and/or the TEE 140 directly communicates with MPC2.

In some implementations, where the application 142 (or the TEE140) and MPC2 communicate via MPC1, in order for the MPC2 to verify the authenticity of the application 142, the application 142 can encrypt its credentials with the public key of MPC2. The encrypted credentials are then transmitted to the MPC1 and the MPC1 forwards the encrypted credentials to the MPC2. Note that since the credentials of the application 142 are encrypted using the public key of the MPC2, data privacy is maintained from MPC1. After receiving the encrypted credentials, MPC2 can first decrypt the encrypted credentials using its private key thereby obtaining the application 142 credentials in plaintext. The MPC2 can compare the decrypted credentials of the application 142 to the credentials previously known by the MPC2. If the credentials match, the MPC2 can verify the authenticity of the application 142.

If any of the computation systems of the MPC cluster 130 is not able to verify the authenticity of the application 142, the MPC cluster 130 can conclude that the application 142 or TEE 140 is compromised and proceed with perform the computations without the application 142, e.g., by performing the computations that the application 142 would perform using secure MPC between MPC1 and MPC. The MPC cluster 130 can also notify the entities that own the different MPC computation systems regarding the breach of trust associated with the application 142 (or the TEE 140) and request an audit.

As described above, each computation system MPC1 and MPC2 can send secret shares of data to the application 142 for use in performing computations within the TEE 140. In some implementations, rather than each computation system MPC1 and MPC2 sending separate messages to the TEE, one of the computation systems (MPC1 in this example) can send a composite message 158 that includes the first secret shares of the data generated by MPC1 and encrypted second secret shares of the data generated by MPC2.

MPC2 can encrypt each of its secret shares using a public key of the application 142 to generate an encrypted secret share and transmit the encrypted secret share to MPC1. Note that the secret share generated by the MPC computation systems is different from the secret shares generated by the computing system 120 where the secret shares are generated by encrypting the subset of data items using the public key of the MPC systems. For brevity, the shares of data items encrypted by the MPC2 and MPC1 for the purpose of transmitting to the application 142 in the TEE 140 are referred to as TEE secret shares. For example, MPC2 can encrypt its share using the public key of the application 142 to generate a second TEE secret share. MPC2 130B then generates a message 156 (referred to as a TEE-MPC2 Request) that includes the second TEE secret share and transmits the message 156 to MPC1. In some implementations, MPC1 can also encrypt its secret share using the public key of the application 142 to generate a first TEE secret share. Note that the computing system MPC1 does not have access to the second TEE secret share in plaintext since it is encrypted by MPC2 using the public key of the TEE 140.

After receiving the message TEE-MPC2 Request 156 and after generating the first TEE secret share, MPC1 can generate a composite message 158 that includes the first TEE secret share and the second TEE secret share. For example, the computing system MPC1 generates a composite message TEE-MPC1-MPC2 request 158 that includes the first TEE secret share and the second TEE secret share and transmits the message 158 to the TEE 140. Note that it may not be necessary for MPC1 to explicitly encrypt a first TEE secret share if the communication channel between MPC1 and application 142 is secure.

In some implementations, after receiving the composite message 158, the application 142 of the TEE 140 decrypts the first TEE secret share (if encrypted) and the second TEE encrypted share, thereby obtaining the two shares of data items in plaintext. After decrypting the first and the second TEE secret shares, the application 142 can combine the two secret shares for each data item to obtain each data item in plaintext. For example if additive secret sharing is used, the application 142 can add the first secret share of a data item to the second secret share of the data item to obtain the data item in plaintext. The application 142 can then perform one or more computations using the plaintext data items to obtain output data based on the plaintext data items.

In some implementations, the TEE 140 can transmit the output data back to the MPC cluster 130 either for further processing by the MPC cluster 130 or for transmission of the output data back to the computing system 120. In some implementations, the application 142 can generate secret shares of the output data and transmit each secret share to a respective computation system of the MPC cluster 130. For example, the application 142 can generate a first secret share of each data item of the output data for MPC1 and a second secret share of each data item of the output data for MPC2. Prior to transmitting the shares of the result, the application 142 can encrypt each secret share of the output data with the public key of the respective computation system of the MPC cluster 130 so that any other entity other than the respective computing system of the MPC cluster 130 cannot perform any kind of man-in-the-middle attack. For example, the application 142 encrypts the first secret share of each data item of the output data using the public key of the computing system MPC1. Similarly, the application 142 encrypts the second secret share of each data item of the output data using the public key of the computing system MPC2. After generating the encrypted secret shares of the output data, the application 142 generates a composite message 160 (referred to as a TEE-MPC1-MPC2 result) that includes the encrypted secret shares of the output data and transmits the message 160 to MPC1. In some implementations, the application 142 may only encrypt the second secret shares for MPC2 since the message 160 is sent to MPC1. This prevents MPC1 from being able to access the second secret shares.

In some implementations, the MPC1 after receiving the composite message TEE-MPC1-MPC2 result 160, decrypts each first secret share of output data (if encrypted) using its private key. The MPC1 also transmits each encrypted second secret share of output data to the computing system MPC2. For example, MPC1 130A generates a message TEE-MPC2 result 162 that includes the encrypted second secret share of the output data and transmits the message 162 to MPC2. Note that since the second secret share of results is encrypted using the public key of MPC2, MPC1 does not have access to the second secret share of the output data.

In some implementations, the TEE 140 can transmit the output data to an entity other than the MPC cluster 130 or the computing system 120. For example, the TEE 140 can transmit the output data to an entity that performs aggregated reporting. In such implementations, the application 142 encrypts the first secret share and the second secret share of the output data using the public key of the entity. The entity after receiving the first and second secret shares can decrypt the secret shares using its private key and combine the shares to recreate the output data. In some implementations, the application 142 does not need to generate shares of output data. Instead, the application 142 can encrypt the output data using the public key of the entity and transmit the encrypted output data to the entity.

In some implementations, the computing system MPC2 130B decrypts the second secret share of each data item of the output data using its private key to obtain the second secret share of each data item of the output data. After decrypting the secret shares of output data, the computation systems MPC1 and MPC2 can either engage in one or more additional rounds of computations or can further transmit the secret shares of results to the computing system 120. For example, assume that the MPC1 and the MPC2 perform multiple rounds of computations to further evaluate the function f to generate a result based on the secret shares of output data and secret shares of the input data. It should be noted that the result is in the form of secret shares where each secret share of the result is held by a respective computation system of the MPC cluster 130. For example, the result is in the form of two secret shares where the first secret share of the result is with MPC1 and the second secret share of the result is with MPC2.

In some implementations, each computation system of the MPC cluster 130 can directly transmit its secret share of result to the computing system 120. In some cases, each computation system of the MPC cluster 130 can encrypt its share of result using the public key of the computing system 120 and transmit the encrypted shares of the results to the computing system 120 via the network 110. This can prevent intermediaries that obtain both shares from being able to combine the shares and obtain the result in plaintext.

In some implementations, the computation systems of the MPC cluster 130 can transmit their respective secret shares of result to a computation system of the MPC cluster 130 that can transmit all the secret shares of result to the computing system 120. For example, MPC2 can encrypt its second secret share of the result using the public key of the computing system 120. MPC2 130B can then create a message 164 (referred to as MPC2 Result) that includes the second encrypted secret share of the result in a message 164. MPC2 can then transmit the message 164 to MPC1. After receiving the message 164, MPC1 can generate a composite message (referred to as composite result message 166) by including its first secret share of the result and the encrypted second share of result received from MPC2. MPC1 can then transmit composite message 166 to the computing system 120.

The computing system 120 after receiving the composite message 166, can decrypt the second secret share of the results using its private key. The computing system 120 can combine the first share of the result with the second share of the result to obtain the final result in plaintext. For example, if additive secret sharing is used, the computing system can add the first secret share of the result to the second secret share of the result.

FIG. 2 is a swim lane diagram of an example process 200 of performing computations using an MPC cluster and an application running in a TEE. Operations of the process 200 can be implemented, for example, by the computing system 120, the MPC cluster 130 and the application 142 of the TEE 140 of FIG. 1. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

The MPC cluster 130 and application can be configured to perform a set of computations using input data received from the computing system to generate a result. The set of computations can include a first subset of computations performed by the computation systems MPC1 and MPC2 of the MPC cluster 130 and a second subset of computations performed by the application. The computations can use the input data and optionally additional data stored by MPC1 and MPC2.

The computing system 120 generates secret shares of input data (202). For example, if the MPC cluster includes two computation systems MP1 and MPC2, the computing system 120 can generate a first secret share of each data item of the input data for MPC1 and a second secret share of each data item of the input data for MPC2. The computing system 120 can use a secret sharing protocol to generate the two secret shares of each data item of the input data.

The computing system 120 transmits the secret shares of the input data to a computation system of the MPC cluster 130 (204). After generating the secret shares, the computing system 120 can transmit the secret shares to a computation system of the MPC cluster 130. For example, the computing system 120 can create a composite message 152 that includes the first secret share of each data item of the input data and the second secret of each data item of the input data. As described above, the computing system 120 can encrypt the second secret shares(s) for MPC2 if the composite message is being sent to MPC1 to prevent MPC1 from accessing the second secret shares. After creating the composite message 152, the computing system 120 transmits the composite message 152 to MPC1 130A.

MPC1 transmits the encrypted second secret share of each data item of the input data to MPC2 (206). For example, MPC1 can create a MPC2-message 154 that includes the encrypted second secret share of each data item of the input data and transmit the MPC2-message 154 to MPC2. Note that MPC1 does not have access to the second secret share(s) since the second secret share(s) are encrypted using the public key of MPC2.

MPC2 decrypts the second secret share of each data item of the input data (208). For example, MPC2 after receiving the MPC2-message 154, decrypts the second secret share of each data item using its private key.

MPC1 and MPC2 collaborate to perform a secure MPC process to perform one or more computations (210). For example, the computation systems MPC1 and MPC2 can engage in multiple rounds of computations as part of a secure MPC process to perform the computations using the secret shares of the input and optionally data stored by the computation systems MPC1 and MPC2. It should be noted that steps 206-210 need not be performed in a sequence as described here. The sequence of the steps 206-210 can be based on the specific implementation of the crypto protocol.

MPC2 generates and encrypts a second share of a second set of data (212). As described above, the MPC cluster 130 can be configured to use the TEE 140 for performing some computations in the set of computations. These computations can be performed using the input data received from the computing system, intermediate data generated by MPC1 and MPC2 using the input data, and/or data stored by MPC1 and MPC2. Thus, the second set of data for which secret shares are provided to the application 142 can include secret shares of the input data received from the computing system, intermediate data generated by MPC1 and MPC2 using the input data, and/or data stored by MPC1 and MPC2.

The computation systems MPC1 and MPC2 of the MPC cluster 130 can transmit their respective secret shares of data items of the second set of data to the application 142 of the TEE 140 in a way that ensures data privacy. For example, to preserve privacy of its secret shares of data items from MPC1, MPC2 encrypts the second share of each data item using the public key of the application 142 to generate a second TEE secret share for each data item.

MPC2 transmits the encrypted secret share of each data item of the second set of data items to MPC1 (214). For example, MPC2 generates a message TEE-MPC2 Request 156 that includes each second TEE secret share and transmits the message 156 to MPC1.

MPC1 transmits the TEE secret shares to the TEE 140 (216). For example, after receiving the message TEE-MPC2 Request 156, MPC1 can generate a composite message 158 that includes its first share of the second set of data items and the second TEE secret shares. The composite message TEE-MPC1-MPC2 request 158 is then transmitted to the TEE 140.

The application 142 decrypts the second TEE secret shares (218). For example, after receiving the composite message TEE-MPC1-MPC2 request 158, the application 142 of the TEE 140 decrypts the second TEE secret shares using its private key.

The application 142 combines the secret shares for each data item (220). For example, if additive secret sharing is used, the application 142 can add the two shares for each data item of the first and the second set of data to obtain the second set of data items in plaintext.

The application 142 performs one or more computations using the second set of data (222). For example, the application 142 can sort the data items of the second set of data, perform vector computations using vectors of the second set of data, etc. As a result of the computation(s), the application 142 generates output data. The output data can include one or more data items. For example, if the computations performed by the application 142 results in a single numerical value, the output data would be the numerical value. In another example, the output data can be a sorted list. In this example, the output data can include multiple data items and each data item can include an identifier for an item in the sorted list and its position in the sorted list.

The TEE 140 generates secret shares of the output data (224). To transmit the result back to the MPC cluster 130 either for further processing by the MPC cluster 130 or for further transmission back to the client device 120, the application 142 can generate secret shares of the result and transmit each secret share to a respective computation system of the MPC cluster 130. For example, the application 142 generates two shares of the output data, including a first secret share for MPC1 and a second secret share for MPC2. After generating the secret shares, the application 142 can encrypt the second secret share of output data using the public key of the computing system MPC2.

The application 142 transmits the secret shares of the output data to MPC1 130A (226). For example, the application 142 generates a composite message TEE-MPC1-MPC2 result 160 that includes the first and the encrypted second secret shares of the output data. The composite message 160 is then transmitted to the MPC1 130A.

MPC1 accesses the first share from the composite message 160 (228). MPC1 can access the first secret share(s) of the output data from the composite message 160.

MPC1 transmits the second secret share(s) of output data to MPC2 (230). For example, MPC1 can generate and transmit a message TEE-MPC2 result 162 to MPC2 that includes the second secret share of each data item of the output data.

MPC2 decrypts the second secret share of each data item of the output data (232). For example, after receiving the message TEE-MPC2 result 162, MPC2 decrypts the second secret share of each data item of the output data using its private key.

MPC1 and MPC2 can perform a secure MPC process to perform one or more operations using the secret shares of the output data (234). For example, the computing systems MPC1 and MPC2 can engage in one or more rounds of computations as part of a secure MPC process to perform additional computations to generate a result based on the secret shares of the output data and optionally additional data (e.g., the secret shares of the input data and/or data stored by MPC1 and MPC2). The computed result is in the form of secret shares where each secret share of the result is held by a respective computation system of the MPC cluster 130. For example, the result is in the form of two secret shares where the first secret share of the result is with MPC1 and the second secret share of the result is with MPC2.

MPC2 130B encrypts the second share of the result data (236). For example, to transmit the result back to the computing system 120 in a way the preserves privacy of the result from MPC1 or any other entity, MPC2 130B can encrypt the second share of the result using the public key of the computing system 120 to generate an encrypted second secret share of result.

MPC2 transmits the encrypted second secret share of the result to MPC1 (238). For example, after generating the encrypted second secret share of the result, MPC2 can generate a MPC2 Result message 164 that includes the encrypted second secret share of the result and transmit the message 164 to the MPC1 130A.

MPC1 130A transmits the secret shares of the result to the computing system 120 (240). For example, after receiving the MPC2 Result message 164, MPC1 can generate a composite result message 166 that includes its first share of the result and the encrypted second share of the result. MPC1 130A then transmits the composite message 166 to the computing system 120.

The computing system 120 decrypts the encrypted second secret share of the result (242). For example, after receiving the message 166, the computing system 120 can decrypt the encrypted second secret share of the result using the private key of the computing system 120.

The computing system 120 combines the first and the second shares of results to obtain the result (244). For example, to obtain the result in plaintext, the computing system 120 can combine the first secret share of the result and the second secret share of the result to obtain the final result in plaintext. If additive secret sharing is used, the computing system can add the first secret share of the result to the second secret share of the result to obtain the result in plaintext.

Although the example process 200 includes two iterations of secure MPCs and one iteration of computations performed by the TEE, other processes implementing the techniques described in this document can employ other quantities and/or orders of MPCs and TEE computations. For example, the MPC can offload computations to the TEE multiple times to arrive at a result.

Figure 3:
FIG. 3 is a flow diagram of an example process of performing computations using an MPC cluster and an application running in a TEE.
Figure 3:
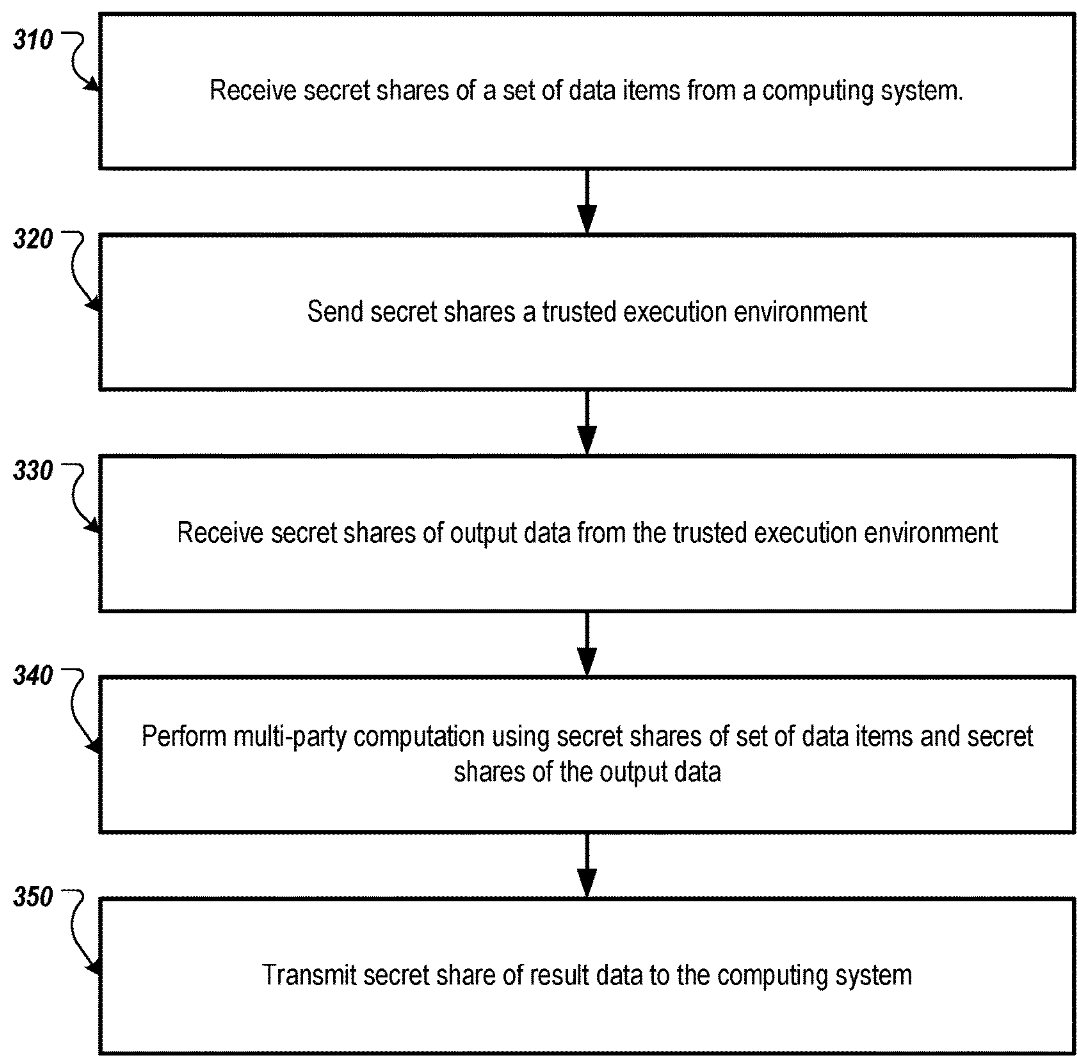

FIG. 3 is a flow diagram of an example process of performing computations using an MPC cluster and an application running in a TEE. Operations of the process 300 can be implemented, for example, by the computing system 120, the MPC cluster 130 and the application 142 of the TEE 140. Operations of the process 300 can also be implemented as instructions stored on one or more computer readable media which may be non-transitory, and execution of the instructions by one or more data processing apparatus can cause the one or more data processing apparatus to perform the operations of the process 300.

The MPC computation systems receive secret shares of a set of data items from the computing system 120 (310). For example, to initiate secure computations by the MPC cluster 130 and the application 142, the computing system 120 can generate secret shares of input data for the MPC cluster 130. For example, the computing system 120 can create a first secret share of the input data for MPC1 and a second secret share of the input data for MPC2. If the input data is a set of data items, e.g., rather than a single value, then the computing system 120 can generate a first secret share of each data item in the set of data items for MPC1 and a second secret share of each data item for MPC2.

In another example in which the MPC cluster evaluates a function using a parameter received from the computing system 120, the first secret share can include a first additive secret share of the parameter and the second secret share can include a second additive secret share of the parameter. For example, the first secret share can be a random number, the second secret share could be the plaintext value of bitwise-XOR with the first secret share. This type of implementation further allows the computing system 120 to hide the parameter from each of the two MPC systems since none of the two MPC systems have access to both the secret shares of the parameter.

To ensure data privacy, the computing system 120 can use a pseudorandom function (PRF) to split the input data (e.g., the set of input data items) into shares. That is, the computing system 120 can use PRF to generate two secret shares {[P1], [P2]}. The use of brackets around parameters indicates secret shares or the parameters throughout this document. The exact splitting can depend on the secret sharing algorithm and cryptographic library used by the computing system 120.

After generating the secret shares of the input data, the computing system 120 provides the secret shares to the computation systems of the MPC cluster 130. For this, the computing system 120 can generate and send a composite message 152 to one of the computation systems of the MPC cluster 130. In the example discussed with reference to FIG. 1, the computing system 120 sends the composite message 152 to MPC1. The composite message 152 can include the first secret share of the input data for MPC1 and an encrypted second secret share of the input data for MPC2. The computing system 120 can generate the encrypted second secret share of the input data by encrypting the second secret share of the input data using a public key of MPC2 using the function PubKeyEncrypt ([P2], MPC2), where PubKeyEncrypt represents a public key encryption algorithm using the public key specified by the algorithm parameter. In this way, only MPC2 can access the second secret share in plaintext by decrypting the encrypted second secret share using its private key that corresponds to the public key. By sending a composite message 152 rather than individual messages to each computation system of the MPC cluster 130, the computing system 120 can conserve computation resources, e.g., processor cycles and battery life, while also reducing the amount of traffic sent across the network 110. In another example, the computing system 120 can encrypt each secret share using the public key of a respective MPC system of the MPC cluster 130 to create a respective encrypted secret share and transmits the respective encrypted secret share to the respective MPC system of the MPC cluster 130.

After receiving the composite message 152, MPC1 130A can decrypt the first secret share using its private key, if the first secret share is encrypted, thereby obtaining the first secret share of the set of the input data in plaintext. To transmit the second secret share to MPC2, MPC1 can create a message 154 (referred to as a MPC2-message) that includes the second secret share. MPC1 then transmits the message 154 to MPC2. After receiving the encrypted second secret share of input data, MPC2 can decrypt the encrypted second secret share of input data using its private key.

The MPC computation system sends secret shares to a TEE (320). For example, after receiving the secret shares from the computing system 120, the computation systems MPC1 and MPC2 can engage in multiple rounds of computations as part of a secure MPC process to determine a result based on the input data, e.g., to evaluate the function f. However, evaluating the function f using a secure MPC process can be time consuming and may require more computing power when compared to a process of evaluating the function f by a single computing system having access to the input data in plaintext. To overcome such a problem, the MPC cluster 130 can use a TEE 140 to expedite the process of determining the result, e.g., evaluating the function f. For example, the MPC cluster 130 can use the application 142 to perform a subset of the computations that would normally be performed by the MPC cluster 130 using the secure MPC process.

For example, the computation systems MPC1 and MPC2 can perform some computations based on the secret shares of the input data and optionally additional data stored by the computation systems MPC1 and MP2. When it is time to perform computations that are performed by the application 142, the computation systems MPC1 and MPC2 can send data to the application 142 for use in performing the computations. This data can be sent in the form of secret shares to maintain data privacy and security. For example, MPC1 can send, to the application 142, a first secret share of each data item for use in the application's computations and MPC2 can send, to the application 142, a second secret share of each data item.

Prior to using application 142 (or the TEE 140), one or more of the computation systems of the MPC cluster 130 can verify the trustworthiness and authenticity of the application 142. For this, the application 142 can use its credentials such as a unique identifier that is known only to the computation systems of the MPC cluster 130. For example, assume that MPC1, MPC2, and the application 142 can have a common knowledge about the credentials of the application 142. To authenticate itself, application 142 can encrypt its credentials using the public key of MPC1 and transmit the encrypted credentials to MPC1. MPC1 can use its private key to decrypt the encrypted credentials of the application 142 to obtain the credentials in plaintext. After decrypting, MPC1 can compare the decrypted credentials of the application 142 to the credentials previously known by the MPC1. If the credentials match, the MPC1 can verify the authenticity of the application 142. The application 142 and MPC2 can follow a similar approach to verify the authenticity of the application 142 if the application 142 and/or the TEE 140 directly communicates with MPC2. In some implementations, the chain of trust for TEE starts with well-known entities (e.g. CPU manufacturers). Each node in the chain can digitally sign the public key of the next node resulting in a multi-stage certificate authority.

Each computation system MPC1 and MPC2 can send secret shares of data to the application 142 for use in performing computations within the TEE 140. However in some situations, rather than each computation system MPC1 and MPC2 sending separate messages to the TEE, one of the computation systems (MPC1 in this example) can send a composite message 158 that includes the first secret shares of the data generated by MPC1 and encrypted second secret shares of the data generated by MPC2.

MPC2 can encrypt each of its secret shares using a public key of the application 142 to generate an encrypted secret share and transmit the encrypted secret share to MPC1. For example, MPC2 can encrypt its share using the public key of the application 142 to generate a second TEE secret share. MPC2 130B then generates a message 156 (referred to as a TEE-MPC2 Request) that includes the second TEE secret share and transmits the message 156 to MPC1. After receiving the message TEE-MPC2 Request 156, MPC1 can generate a composite message 158 that includes the first TEE secret share and the second TEE encrypted secret share. For example, the computing system MPC1 generates a composite message TEE-MPC1-MPC2 request 158 that includes the first TEE secret share and the second TEE encrypted secret share and transmits the message 158 to the TEE 140.

The MPC computation system receives shares of output data from the TEE (330). After receiving the composite message 158, the application 142 of the TEE 140 decrypts the first TEE secret share (if encrypted) and the second TEE encrypted share, thereby obtaining the two shares of data items in plaintext. After decrypting the second TEE secret shares, the application 142 can combine the two secret shares for each data item to obtain each data item in plaintext. For example if additive secret sharing is used, the application 142 can add the first secret share of a data item to the second secret share of the data item to obtain the data item in plaintext. The application 142 can then perform one or more computations using the plaintext data items to obtain output data based on the plaintext data items.

The TEE 140 can transmit the output data back to the MPC cluster 130 either for further processing by the MPC cluster 130 or for transmission of the output data back to the computing system 120. In some implementations, the application 142 can generate secret shares of the output data and transmit each secret share to a respective computation system of the MPC cluster 130. For example, the application 142 can generate a first secret share of each data item of the output data for MPC1 and a second secret share of each data item of the output data for MPC2. Prior to transmitting the shares of the result, the application 142 can encrypt each secret share of the output data with the public key of the respective computation system of the MPC cluster 130 so that any other entity other than the respective computing system of the MPC cluster 130 cannot perform any kind of man-in-the-middle attack. For example, the application 142 encrypts the first secret share of each data item of the output data using the public key of the computing system MPC1. Similarly, the application 142 encrypts the second secret share of each data item of the output data using the public key of the computing system MPC2. After generating the encrypted secret shares of the output data, the application 142 generates a composite message 160 (referred to as a TEE-MPC1-MPC2 result) that includes the encrypted secret shares of the output data and transmits the message 160 to MPC1. In some implementations, the application 142 may only encrypt the second secret shares for MPC2 since the message 160 is sent to MPC1 directly or via a secure channel (for e.g., HTTP/SSL). This prevents MPC1 from being able to access the second secret shares.

The computation system of the MPC cluster 130 performs multi-party computation using secret shares of a set of data items and secret shares of the output data (340). For example, the computing systems MPC1 and MPC2 can engage in one or more rounds of computations as part of a secure MPC process to perform additional computations to generate a result based on the secret shares of the output data and optionally additional data (e.g., the secret shares of the input data and/or data stored by MPC1 and MPC2). The computed result is in the form of secret shares where each secret share of the result is held by a respective computation system of the MPC cluster 130. For example, the result is in the form of two secret shares where the first secret share of the result is with MPC1 and the second secret share of the result is with MPC2.

The computation system of the MPC cluster 130 transmits the result back to the computing system 120 (350). For example, each computation system of the MPC cluster 130 can directly transmit its secret share of result to the computing system 120. In such implementations, each computation system of the MPC cluster 130 can encrypt its share of result using the public key of the computing system 120 and transmit the encrypted shares of the results to the computing system 120 via the network 110.

The computation systems of the MPC cluster 130 can transmit their respective secret shares of result to a computation system of the MPC cluster 130 that can transmit all the secret shares of result to the computing system 120. For example, MPC2 can encrypt its second secret share of the result using the public key of the computing system 120. MPC2 130B can then create a message 164 (referred to as MPC2 Result) that includes the second encrypted secret share of the result in a message 164. MPC2 can then transmit the message 164 to MPC1. After receiving the message 164, MPC1 can generate a composite message (referred to as composite result message 166) by including its first secret share of the result and the encrypted second share of result received from MPC2. MPC1 can then transmit composite message 166 to the computing system 120.

The computing system 120 after receiving the composite message 166, can decrypt the second secret share of the results using its private key. The computing system 120 can combine the first share of the result with the second share of the result to obtain the final result in plaintext. For example, if additive secret sharing is used, the computing system can add the first secret share of the result to the second secret share of the result.

The following description relates to an example implementation of the systems and techniques described above in which an MPC cluster 130 transfers some operations that would have been performed using secure MPC to an application running in a TEE 140 to provide digital components to a computing system. An MPC cluster can perform a secure MPC process to select digital components based on user information without either MPC computation system being able to access the user information in plaintext. The user information can be sent to the MPC cluster using secret sharing and probabilistic data structures, e.g., cuckoo filters, to maintain the confidentiality of the user information (e.g., prevent the MPC cluster from accessing the user information in plaintext) and to reduce the data size of the information being transmitted over a network.

The MPC cluster can determine selection values for digital components using vector computations, e.g., vector dot product computations. For example, the MPC cluster can determine a selection value for a digital component by determining a dot product between a vector of values generated for a user group for the digital component and a vector of values generated based on contextual signals for a digital component presentation environment. A selection value can indicate an amount that a digital component provider is willing to provide for the display of, or user interaction with, the digital component.

In some cases, it is beneficial to a user to receive digital components related to web pages, application pages, or other electronic resources previously visited and/or interacted with by the user. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by the application. More specifically, the digital component may include digital content that is relevant to the resource content, e.g., the digital component may relate to the same topic as the web page content, or to a related topic. The provision of digital components can thus supplement, and generally enhance, the web page or application content.

In order to distribute such digital components to users, the users can be assigned to user groups, e.g., user interest groups that are related to respective topics, cohorts of similar users, or other group types involving similar user data.

A user's group membership can be maintained at the user's computing system 120, e.g., by the applications, or the operating system of the computing system 120, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the computing system 120). The user group list can include a group identifier for each user group that includes the user as a member. The user group identifier for a user group can be descriptive of the group (e.g., gardening group) or a code that represents the group (e.g., an alphanumeric sequence that is not descriptive). The user group list for a user can be stored in secure storage at the computing system 120 and/or can be encrypted when stored to prevent others from accessing the list.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In general, when the application (for e.g., a browser) executing on a computing system 120 (for e.g., a client device) loads a resource (or application content) that includes one or more digital component slots, the application can request a digital component for each slot. The digital component slot can include code (e.g., scripts) that cause the application to request a digital component from a digital component distribution system that selects a digital component and provides the digital component to the application for presentation to a user of the computing system 120. As described below, the application can request digital components from the MPC cluster 130

The computing systems MPC1 and MPC2 of the MPC cluster 130 can store user group-based vectors of values V_dc for a digital component. The values can be floating point values or values of a different computer number format. Such a user group-based vector V_dc can be used to determine a selection value for the digital component for use in digital component selection processes for selecting a digital component to distribute for presentation to users in the user group. The user group-based vector V_dc can include multiple elements across two or more dimensions and each element can represent a particular feature of a digital component presentation opportunity. For example, the user group-based vector of values V_dc can include elements for geographic locations or regions, spoken languages, ages or age ranges, particular URLs of web pages or other electronic resources, particular products or services, whether a digital component slot is above or below the fold, the type of digital component slot, the size of the digital component slot, the number of digital component slots on the electronic resource, the time of day, web property identifier, and/or other appropriate features. In some implementations, the user group-based vector V_dc can be an embedding in some embedding space, i.e. a point in high dimension embedding space.

The MPC cluster 130 performs a digital component selection process to selected a digital component to distribute to the computing device 120 of a user based on selection values, user group membership of the user, and/or other appropriate information. The MPC cluster 130 can offload some of the computations to an application 142 running in a TEE to increase the speed at which a digital component is selected, which is critical in digital component distribution processes that are required to occur in milliseconds. The MPC cluster 130 transmits a selection result to the application. The selection result can include the selected digital component, a resource locator for a network location at which the digital component can be downloaded, and/or other appropriate information related to the selected digital component. This selection result can be in the form of secret shares, similar to the results sent to the computing system 120, as described above. An example selection process 400 is illustrated in FIG. 4 and described below.

Figure 4:
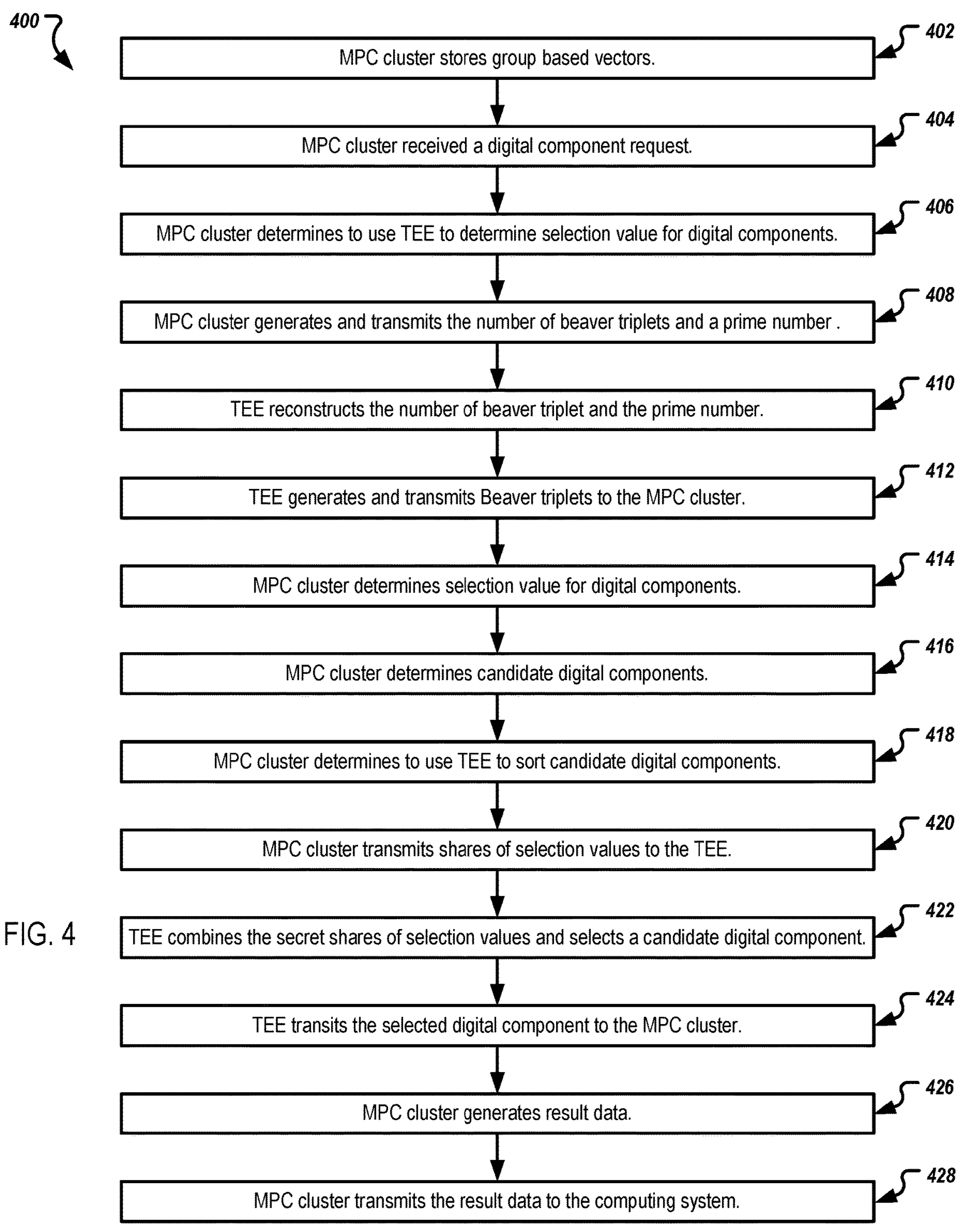
FIG. 4 is a flow diagram of an example process for selecting a digital component for distribution to a client device.

FIG. 4 is a flow diagram that illustrates an example process 400 for selecting a digital component for distribution to a client device. Operations of the process 400 can be implemented, for example, by the computing system MPC1 or the computing system MPC2 of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400.

The MPC cluster 130 stores a user group-based vector of values for a digital component (402). For example, the computing systems MPC1 and MPC2 of the MPC cluster 130 can store a user group-based vector of values V_dc for a digital component. The values can be floating point values or values of a different computer number format. Such a user group-based vector V_dc can be used to determine a selection value for the digital component for use in digital component selection processes for selecting a digital component to distribute for presentation to users in the user group. The user group-based vector V_dc can include multiple elements across two or more dimensions and each element can represent a particular feature of a digital component presentation opportunity. The MPC cluster 130 can store one or more user group-based vectors for each of multiple digital components. Each user group-based vector for a digital component is for a particular user group and includes values that are used in the digital component selection process when the digital component is being considered for distribution to a user that is a member of the particular user group.

The MPC cluster 130 receives, from a computing device 120, a digital component request (404). For example, the computing system 120 such as a client device can maintain the user's group membership data. The computing system 120 can generate secret shares of the user's group membership data and transmit the shares to the MPC cluster along with a digital component request. For example, the MPC1 receives a digital component request that can include a first secret share of data that identifies one or more user groups the user of the computing system 120 is a member. MPC2 also receives a similar digital component request that includes a second secret share of data. In some implementations, the digital component request received by MPC1 includes the second secret share of data. In such implementations, the second secret share of data is encrypted by the computing system 120 using the public key of MPC2. After receiving the digital component request, MPC1 can transmit the encrypted second secret share of data to MPC2. For example, MPC1 can receive a composite message 152 from the computing system 120 that includes a first secret share and an encrypted second secret share that includes the user group identifiers of the user groups that include the user as a member. MPC1 then transmits MPC2-Message 154 to MPC2 that includes the encrypted second secret share.

In some implementations, the computing system 120 can also include a set of contextual signals in the digital component request (e.g., URL, location, language, etc.) or a set of contextual signals for which a digital component is eligible for distribution. The set of contextual signals can be in the form of a vector V_ug. In some implementations, the computing system 120 can generate secret shares of the contextual signals and transmit the shares to the MPC cluster along with a digital component request. For example, the MPC1 receives a digital component request that can include a first secret share of contextual signals and MPC2 also receives a similar digital component request that includes a second secret share of contextual signals.

The computing systems of the MPC cluster 130 determine to use the TEE 140 to determine a selection value for each digital component based on the V_dc and the V_ug (406). For example, the MPC cluster 130 can determine a dot product of the two vectors V_ug and V_dc for each digital component. If the vectors V_ug and V_dc are in the form of secret shares, MPC1 can collaborate with computing system MPC2 to determine secret shares of the dot product of the vectors V_ug and V_dc for each digital component to obtain secret shares of a selection value for the digital component. However since computing a dot product of two vectors in secret shares in a 2PC setup is computationally expensive, the MPC cluster 130 determines to use the TEE 140 to compute the dot product of vectors V_ug and V_dc.

In some implementations, the MPC cluster 130 is configured to send the selection value computations to the TEE 140. For example, the MPC protocol executed by the MPC cluster 130 can include a transfer of these computations to the TEE 140. To compute the dot product of vectors V_ug and V_dc, the MPC cluster 130 can transmit the secret shares of the vectors V_ug and V_dc to the application 142 of the TEE 140 where the application 142 can combine the secret shares of the vectors V_ug and V_dc to reconstruct the vectors V_ug and V_dc in plaintext. The application 142 can then compute the dot product of the two vectors V_ug and V_dc.

The MPC cluster 130 generates and transmits secret shares of the number of Beaver triples and a prime number to the application 142 of the TEE 140 (408). For example, the MPC1 and MPC2 can generate secret shares for the number of Beaver triples and a prime number p. MPC2 can encrypt its share of the number of Beaver triples and the prime number p using the public key of the application 142 to generate an encrypted second TEE secret share. MPC2 then generates a message 156 (referred to as a TEE-MPC2 Request) that includes the encrypted second TEE secret share and transmits the message 156 to MPC1. After receiving the message TEE-MPC2 Request 156, MPC1 can generate a composite message TEE-MPC1-MPC2 request 158 that includes its secret shares of the number of Beaver triples and the prime number p and the encrypted second TEE secret share of MPC2. The composite message TEE-MPC1-MPC2 request 158 is then transmitted to the application 142 of the TEE 140.

The application 142 of the TEE 140 reconstructs the number of Beaver triples and the prime number (410). For example, after receiving the composite message TEE-MPC1-MPC2 request 158, the application 142 decrypts the secret shares for the number of Beaver triples using its private key and combines the decrypted shares to obtain the number of Beaver triples in plaintext. Similarly, the application 142 decrypts the secret shares of the prime number p using its private key and combines the decrypted secret shares to obtain p. In some implementations, the number of Beaver triples and the prime number may not be privacy sensitive, therefore the MPC cluster 130 may send the number of Beaver triples and the prime number in cleartext to the application 142.

The application 142 of the TEE 140 generates and transmits Beaver triples to the MPC cluster 130 (412). For example, after obtaining the number of Beaver triples and the prime number p in plaintext, the TEE 140 can generate three n-dimensional vectors A, B and C such that $C_j=A_j \times B_j \bmod p$. The TEE 140 also generates additive shares of the vectors A, B and C that can be represented as $[A]_i$, $[B]_i$ and $[C]_i$ where $i \in [1,2]$. For example, $[A]_1$ and $[A]_2$ are two additive secret shares of A. Similarly $[B]_1$, $[B]_2$ and $[C]_1$, $[C]_2$ are two additive secret shares of B and C respectively.

After generating the additive shares of the vectors A, B and C, the TEE 140 encrypts the additive shares $[A]_2$, $[B]_2$ and $[C]_2$ using the public key of the MPC2 130B. This can be denoted as PubKeyEncrypt ($\{[A]_2, [B]_2, [C]_2\}$, MPC2). The TEE 140 can also encrypt the additive shares $[A]_1$, $[B]_1$ and $[C]_1$ using the public key of the MPC1 130A however it may not be required. This can be denoted as PubKeyEncrypt ($\{[A]_1, [B]_1, [C]_1\}$, MPC1). After encrypting the additive shares, the application 142 transmits the additive shares of the vectors $\{[A]_1, [B]_1, [C]_1\}$ to MPC1 130A and the encrypted additive shares $\{[A]_2, [B]_2, [C]_2\}$ to MPC2. For example, the application 142 generates a composite message 160 that includes the additive shares of the vectors $\{[A]_1, [B]_1, [C]_1\}$ and the encrypted additive shares $\{[A]_2, [B]_2, [C]_2\}$.

The MPC cluster 130 determines a selection value for each digital component based on V_ug and V_dc (414). For example, the MPC1 after receiving the message 160 retains the encrypted additive shares of the vectors $\{[A]_1, [B]_1, [C]_1\}$ and forwards the encrypted additive shares $\{[A]_2, [B]_2, [C]_2\}$ to MPC2 by including the encrypted additive shares in the message TEE-MPC2 result 162 and transmitting the message 162 to MPC2 130B. MPC1 and MPC2 after receiving the respective encrypted additive shares, can decrypt the respective additive shares using their private key to obtain the respective additive shares in plaintext thereby having necessary beaver triples to complete the dot product computation of vectors V_ug and V dc.

The MPC cluster 130 determines if a digital component is a candidate for presentation to the user (416). In some implementations, the MPC1 and MPC2 can determine a candidate parameter that indicates whether a digital component satisfies one or more conditions for eligibility in the digital component selection process. These conditions can include, for example, whether the user group associated with the digital component matches a user group of the user to which the digital component will be provided; whether the digital component satisfies a frequency control condition that prevents the same user from being exposed to the same digital component more than a specified number of times within a period of time; whether the digital component satisfies a muted condition that prevents the digital component from being presented to a user that has selected to mute; whether the digital components satisfies a k-anonymity condition; and/or whether a campaign that includes the digital component satisfies a pacing eligibility condition that paces the distribution of digital components in the campaign.

For example, candidate parameter for a digital component indicates whether the user group identifier for the digital component matches a user group identifier for a user group that includes the user of the computing system 120 as a member. If so, the digital component is a candidate digital component that is a candidate for being selected. The computing system MPC1 can collaborate with MPC2 systems using a secure MPC process to obtain a first secret share of the candidate parameter. Similarly, MPC2 obtains the second secret share of the candidate parameter. This determination of the candidate parameter can be performed after filtering the digital components based on the secret shares of the user's group membership provided by the computing system 120 in step 402 of the process 400.

The MPC cluster determines to use the TEE 140 to sort the selection results of the candidate digital components (418). For example, after identifying the candidate digital components, the MPC cluster 130 can sort the selection values of the candidate digital components to select a digital component that has the highest selection value. However, since the candidate parameters of the candidate digital components are in the form of secret shares with the respective computation system of the MPC cluster 130, sorting the selection results becomes a computationally expensive process. To perform the task in a computationally inexpensive way, the MPC cluster 130 can determine to use the TEE 140 to sort the selection values.

The MPC cluster 130 transmits the shares of selection values to the TEE 140 (420). For example, MPC2 can encrypt its share of selection values of candidate digital components and transmit the encrypted secret share of selection values to MPC1. MPC1 can generate a composite message TEE-MPC1-MPC2 request 158 that includes its secret shares of the selection values of the candidate digital components and the encrypted secret shares of the selection values of MPC2. The composite message TEE-MPC1-MPC2 request 158 is then transmitted to the application 142 of the TEE 140.

In some implementations, the MPC cluster 130 also transmits an index of the candidate digital components in secret shares to the TEE 140 so as to let the TEE 140 map each selection value to an index of a candidate digital component. This would allow the TEE 140 to select a digital component using its index that can later be identified by the MPC cluster 130.

The TEE 140 combines the secret shares of selection values and sorts the selection values (422). For example, after receiving the composite message TEE-MPC1-MPC2 request 158, the application 142 decrypts the secret shares of selection values of candidate digital components and combines the decrypted shares to obtain the selection values in plaintext. After obtaining the secret shares of the selection values of candidate digital components in plaintext, the TEE 140 can sort the selection values. For example, the TEE 140 sorts the indices of the candidate digital components based on their selection value.

In some implementations, the TEE 140 transmits the index of the digital component with the highest selection value to the MPC cluster 130 (424). For example, the TEE 140 can generate two secret shares of the selected index of the selected digital component and transmits the shares to a respective computation system of the MPC cluster 130. For example, the TEE 140 can encrypt the second secret share of the index using the public key of MPC2 and generate a message Composite TEE-MPC1-MPC2 Result160 that includes the first secret share and the encrypted second share of the selected index. The message 160 is then transmitted to MPC1. In some implementations, the TEE 140 transmits the list of indices sorted based on the corresponding selection value to the MPC cluster 130 (424).

The MPC cluster 130 generates result data (426). For example, after receiving message 160, MPC1 retains the first secret share of the index and generates a message TEE-MPC2 Result 162 that includes the encrypted second secret share of the selected index. The message 162 is then transmitted to MPC2 where the MPC2 uses its private key to decrypt the encrypted second secret share of the selected index. The MPC cluster 130 can then identify the selected candidate digital component or the data that identifies the selected candidate digital component (referred to as selection result). For example, MPC1 can collaborate with MPC2 using a secure MPC process to generate the selection result. The selection result identifies the candidate digital component having the highest selection value selected by the TEE 140. For example, the selection result can include both data and instructions to present the selected digital component on the computing system 120. In another example, the selection result can include a URL from where the selected digital component can be retrieved for presentation.

The MPC cluster 130 transmits the result data to the computing system 120 (428). For example the selection result identifies the selected digital component and the selection value for the candidate digital component that was selected by the TEE 140. The MPC cluster 130 can transmit secret shares of the selection result from each of the one or more additional MPC systems. The computing system 120 can reconstruct the selection result using the secret shares of the selection result. The computing system 120 can then obtain the selected digital component for presentation. For example, if the selection result is an URL, the computing system 120 can obtain the digital component using the URL for presentation.

Figure 5:
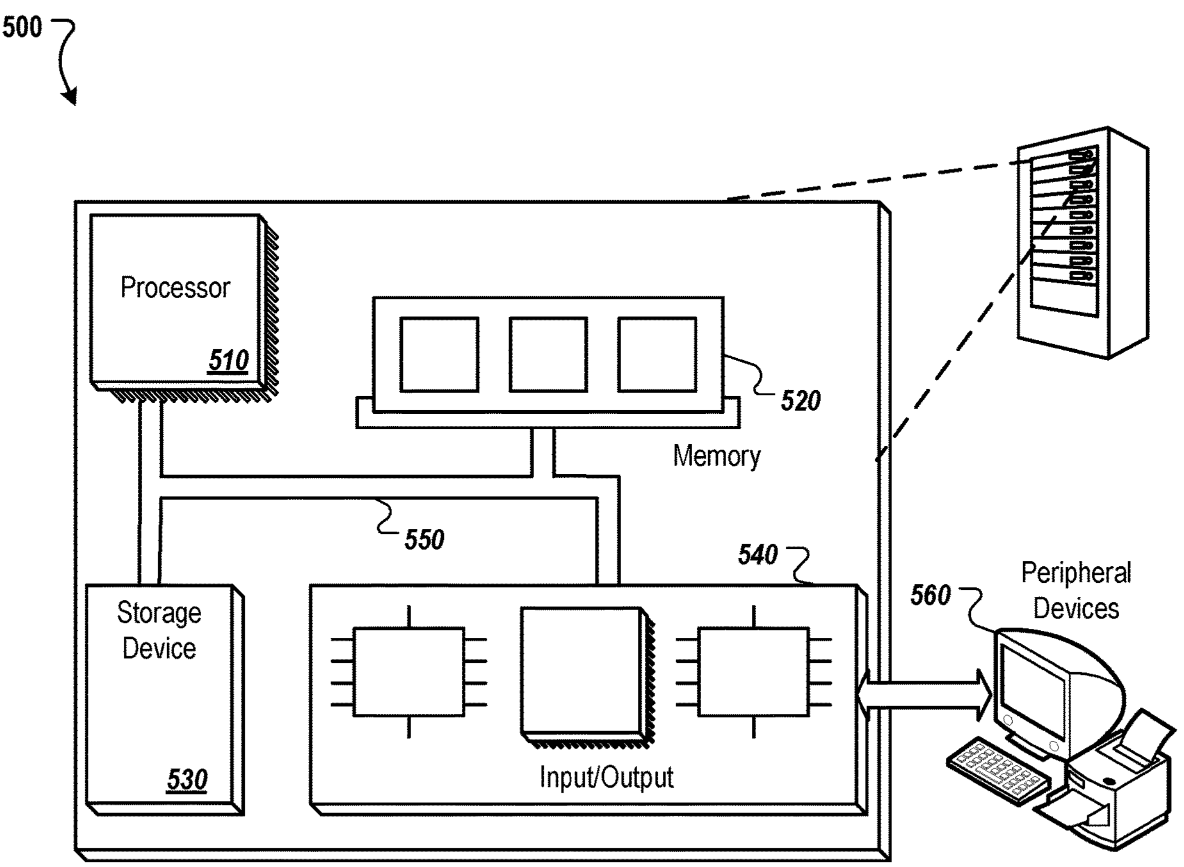
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 400. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, from a computing system and by a first multi-party computation (MPC) system of a cluster of MPC systems, a first secret share of input data;

sending, by the first MPC system and to an application running in a trusted execution environment (TEE) separate from the cluster of MPC systems, first secret shares of a set of data items generated based at least in part on the first secret share of the input data, wherein the application is configured to generate secret shares of application output data, the secret shares of the application output data generated based on one or more computations using plaintext values of the set of data items, the plaintext values of the set of data items being generated using (i) the first secret shares of the set of data items and (ii) respective second secret shares of the set of data items provided by one or more second MPC systems of the cluster;

performing, by the first MPC system in collaboration with the one or more second MPC systems of the cluster, one or more secure multi-party computations using: (i) the first secret share of the input data, (ii) a respective second secret share of the input data received by each of the one or more second MPC systems, (iii) a first secret share of the output data received from the application by the first MPC system, and (iv) a respective second secret share of the output data received from the application by each of the one or more second MPC systems; and sending, by the first MPC system, a first secret share of result data resulting from the one or more secure multi-party computations to at least one of (i) the computing system or (ii) one or more additional computing systems different from the computing system.

2. The computer-implemented method of claim 1, wherein the computing system generates plaintext result data by combining the first secret share of the result data with a respective secret share of the result data received from each of the one or more second MPC systems.

3. The computer-implemented method of claim 1, wherein the application is configured to:

compute plaintext values of the set of data items by combining the first secret shares of the set of data items with respective second secret shares of the set of data items received from the one or more second MPC systems;

perform one or more computations using at least the plaintext values of the second set of data items;

generate secret shares of application output data generated based on the one or more computations;

provide the first secret share of the application output data to the first MPC system; and provide, to each second MPC system, the respective second secret share of the application output data for the second MPC system.

4. The computer-implemented method of claim 1, further comprising:

receiving, from the computing system by the first MPC system, a respective encrypted second secret share of the input data for each of the one or more second MPC systems; and providing, by the first MPC system to each second MPC system, the respective encrypted second secret share of the input data for the second MPC system.

5. The computer-implemented method of claim 4, wherein the first MPC system receives the first secret share of the input data and the respective encrypted second secret share of the input data for each of the one or more second MPC systems in a composite request sent from the computing system.

6. The computer-implemented method of claim 1, wherein sending, by the first MPC system, a first secret share of result data resulting from the one or more secure multi-party computations to the computing system comprises sending a composite message comprising the first secret share of the result data and respective encrypted second secret shares of the result data received from the one or more second MPC systems.

7. The computer-implemented method of claim 1, wherein sending, by the first MPC system, the first secret shares of the set of the data items to the application comprises sending, to the application, a composite message comprising the first secret shares of the set of data items and respective encrypted second secret shares of the set of data items received from the one or more second MPC systems.

8. The computer-implemented method of claim 7, further comprising:

receiving, from the application by the first MPC system, the first secret share of the application output data and a respective encrypted second secret share of the application output data for each of the one or more second MPC systems; and providing, to each second MPC system, the respective encrypted second secret shares of the application output data.

9. The method of claim 1, further comprising verifying trustworthiness of the application running in the TEE prior to sending the first secret shares of the first set of data items to the application.

10. The method of claim 1, wherein the one or more computations performed by the application comprise (i) one or more vector dot product computations, (ii) one or more sorting operations, or (iii) a combination of (i) and (ii).

11. The method of claim 1, further comprising generating the first secret shares of the set of data items based on the first secret share of the input data and additional data stored by the first MPC system.

12. A system comprising:

one or more processors; and one or more storage devices storing instructions that, when executed by the one or more processors, cause the one or more processor to perform operations comprising:

receiving, from a computing system and by a first multi-party computation (MPC) system of a cluster of MPC systems, a first secret share of input data;

sending, by the first MPC system and to an application running in a trusted execution environment (TEE) separate from the cluster of MPC systems, first secret shares of a set of data items generated based at least in part on the first secret share of the input data, wherein the application is configured to generate secret shares of application output data, the secret shares of the application output data generated based on one or more computations using plaintext values of the set of data items, the plaintext values of the set of data items being generated using (i) the first secret shares of the set of data items and (ii) respective second secret shares of the set of data items provided by one or more second MPC systems of the cluster;

performing, by the first MPC system in collaboration with the one or more second MPC systems of the cluster, one or more secure multi-party computations using: (i) the first secret share of the input data, (ii) a respective second secret share of the input data received by each of the one or more second MPC systems, (iii) a first secret share of the output data received from the application by the first MPC system, and (iv) a respective second secret share of the output data received from the application by each of the one or more second MPC systems; and sending, by the first MPC system, a first secret share of result data resulting from the one or more secure multi-party computations to at least one of (i) the computing system or (ii) one or more additional computing systems different from the computing system.

13. The system of claim 12, wherein the operations further comprise:

generating plaintext result data by combining the first secret share of the result data with a respective secret share of the result data received from each of the one or more second MPC systems.

14. The system of claim 12, wherein the application is configured to:

compute plaintext values of the set of data items by combining the first secret shares of the set of data items with respective second secret shares of the set of data items received from the one or more second MPC systems;

perform one or more computations using at least the plaintext values of the second set of data items;

generate secret shares of application output data generated based on the one or more computations;

provide the first secret share of the application output data to the first MPC system; and provide, to each second MPC system, the respective second secret share of the application output data for the second MPC system.

15. The system of claim 12, wherein the operations further comprise:

receiving, from the computing system by the first MPC system, a respective encrypted second secret share of the input data for each of the one or more second MPC systems; and providing, by the first MPC system to each second MPC system, the respective encrypted second secret share of the input data for the second MPC system.

16. The system of claim 12, wherein sending, by the first MPC system, a first secret share of result data resulting from the one or more secure multi-party computations to the computing system comprises sending a composite message comprising the first secret share of the result data and respective encrypted second secret shares of the result data received from the one or more second MPC systems.

17. A non-transitory computer readable storage medium carrying instructions that, when executed by one or more processors, cause the one or more processors to perform operations comprising:

receiving, from a computing system and by a first multi-party computation (MPC) system of a cluster of MPC systems, a first secret share of input data;

sending, by the first MPC system and to an application running in a trusted execution environment (TEE) separate from the cluster of MPC systems, first secret shares of a set of data items generated based at least in part on the first secret share of the input data, wherein the application is configured to generate secret shares of application output data, the secret shares of the application output data generated based on one or more computations using plaintext values of the set of data items, the plaintext values of the set of data items being generated using (i) the first secret shares of the set of data items and (ii) respective second secret shares of the set of data items provided by one or more second MPC systems of the cluster;

performing, by the first MPC system in collaboration with the one or more second MPC systems of the cluster, one or more secure multi-party computations using: (i) the first secret share of the input data, (ii) a respective second secret share of the input data received by each of the one or more second MPC systems, (iii) a first secret share of the output data received from the application by the first MPC system, and (iv) a respective second secret share of the output data received from the application by each of the one or more second MPC systems; and sending, by the first MPC system, a first secret share of result data resulting from the one or more secure multi-party computations to at least one of (i) the computing system or (ii) one or more additional computing systems different from the computing system.

18. The non-transitory computer readable storage medium of claim 17, wherein the operations further comprise:

generating plaintext result data by combining the first secret share of the result data with a respective secret share of the result data received from each of the one or more second MPC systems.

19. The non-transitory computer readable storage medium of claim 17, wherein the application is configured to:

compute plaintext values of the set of data items by combining the first secret shares of the set of data items with respective second secret shares of the set of data items received from the one or more second MPC systems;

perform one or more computations using at least the plaintext values of the second set of data items;

generate secret shares of application output data generated based on the one or more computations;

provide the first secret share of the application output data to the first MPC system; and provide, to each second MPC system, the respective second secret share of the application output data for the second MPC system.

* * * * *